Aug. 5, 1969  G. E. HORNSBY  3,459,441
AIR CUSHION SHOCK ABSORBER FOR BICYCLES, MOTORCYCLES
AND SIMILAR VEHICLES
Filed June 5, 1967
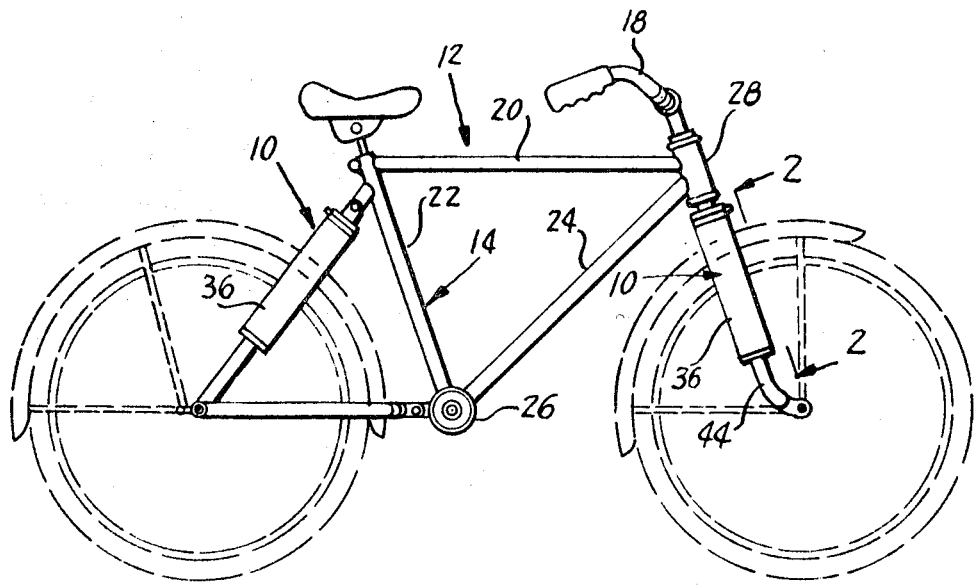
FIG. 1
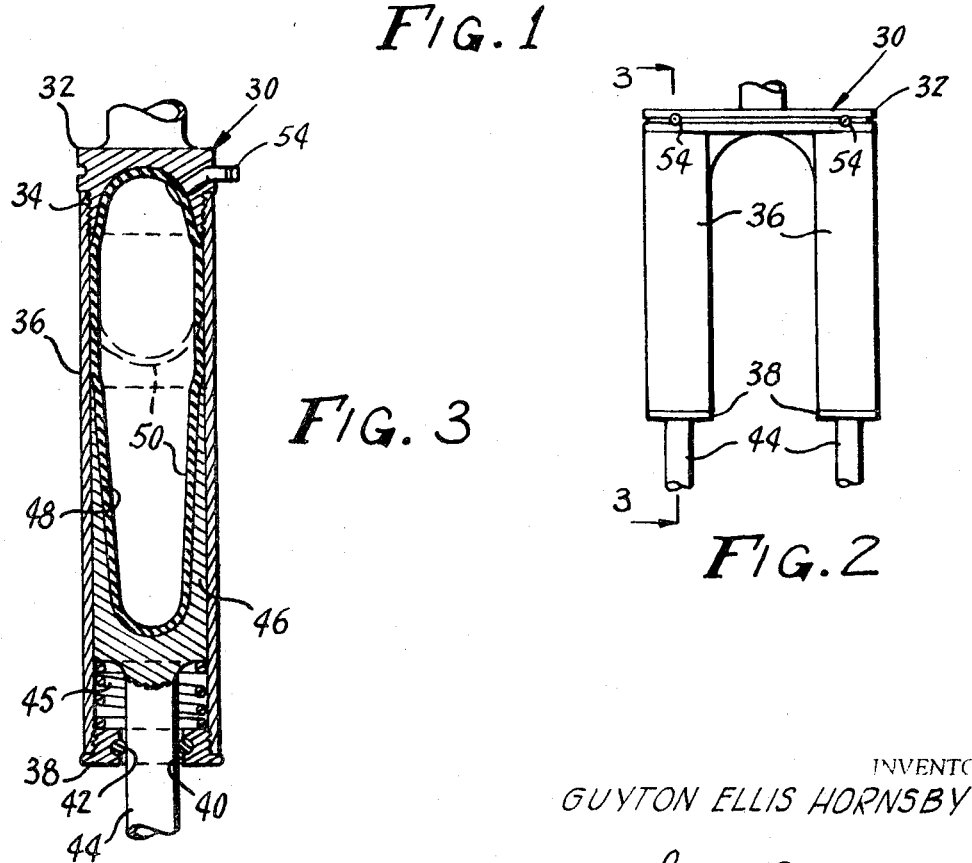
FIG. 3
FIG. 2
INVENTOR.
GUYTON ELLIS HORNSBY
BY John O. Dickman III
AGENT.

United States Patent Office 3,459,441
Patented Aug. 5, 1969

3,459,441
AIR CUSHION SHOCK ABSORBER FOR BICYCLES, MOTORCYCLES AND SIMILAR VEHICLES
Guyton Ellis Hornsby, 4001 Rose Lane,
Annandale, Va. 22003
Filed June 5, 1967, Ser. No. 643,428
Int. Cl. B62k *3/00, 3/02;* B60g *11/26*
U.S. Cl. 280—276          6 Claims

ABSTRACT OF THE DISCLOSURE

A shock absorbing suspension for vehicles, especially bicycles and motorcycles which employes air as the cushioning component. The frame of the bicycle or motorcycle includes telescopic piston and cylinder assemblies with each assembly having an air bag incorporated therein to cushion movement of the piston inwardly in the cylinder.

---

The present invention generally relates to a shock absorber construction incorporated into a bicycle or motorcycle frame and more particularly to a shock absorbing construction employing air as the cushioning component.

An object of the present invention is to provide a shock absorber construction for a bicycle or motorcycle frame in which an air bag is disposed between telescopic piston and cylinder assembles in the front and rear frame members thereby absorbing shock normally transmitted through the frame for providing a smoother and more comfortable ride.

Another object of this invention is to provide an air bag shock absorbing frame for a bicycle or the like in which the piston which engages the bag has a longitudinal recess therein receiving a substantial portion of the air bag.

A further object of the present invention resides in its simplicity of construction, efficiency in operation and relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a bicycle with the air shock absorber of the present invention incorporated therein;

FIGURE 2 is a front elevation of the front fork taken along reference line 2—2 on FIG. 1; and FIGURE 3 is a longitudinal sectional view, on an enlarged scale, taken along section line 3—3 on FIG. 2 illustrating the construction of the air bag and the piston and cylinder assembly.

Referring now specifically to the drawings, the shock absorber constituting the present invention is generally designated by numeral 10 and is installed in a conventional bicycle 12 which has the usual frame 14, seat 16, handlebars 18 and other conventional components which have been omitted for clarity. The frame 14 includes a horizontal member 20, a downwardly and forwardly inclined member 22 at the rear thereof, and a downwardly and rearwardly inclined member 24 at the front end thereof. Members 22 and 24 are joined by a crank housing 26 while members 20 and 24 are joined by a tubular member 28. The tubular member 28 supports a front fork or yoke 30 for steering movement as controlled by the handlebars.

The yoke 30 includes a top plate 32 having a pair of depending externally threaded collars 34 each of which screw threadedly receives a tubular cylinder 36. The lower end of each cylinder 36 has a closure cap 38 with a central opening 40 provided with an O-ring seal 42 engaging a rod 44 extending therethrough and a spring 45 disposed inwardly thereof. The lower end of the rod 44 curves forwardly and engages the wheel axle in a conventional manner.

The upper end of the rod 44 is provided with an elongated piston 46 slidable in the cylinder 36 and provided with an elongated recess 48 therein which tapers inwardly from the inner end of the piston 46. An elongated air bag 50 has a substantial portion thereof disposed in the recess 48 and a portion engaging the cylinder 30 and a portion engaging a recess in the plate 30. The portion which engages the plate 30 is provided with an air valve 54 extending through a passage in plate 32 to enable inflation and deflation of the air bag to vary the cushioning characteristics thereof.

By using the air bag shock absorber in the front and rear yoke or fork, shock normally transferred to the frame will be cushioned so that the rider will be more comfortable and will be able to operate the bicycle in a safer way.

What is claimed as new is as follows:

1. A shock absorber construction for use on a bicycle, motorcycle or the like having a supporting frame including a fork journalling a wheel therein, said fork including a top plate having upper and lower portions, a pair of parallel cylinders rigid with said top plate and spaced from each other, an elongated piston slidable in each cylinder, a rod rigid with the piston and extending from the cylinder for supporting a wheel, and air bag cushioning means between said inner end of said piston and the lower portion of said plate, said air bag cushioning means including an elongated flexible bag and means extending through said top plate to enable inflation and deflation of the air bag cushioning means for varying the cushioning characteristics thereof, said piston including an elongated recess therein receiving a substantial portion of said air bag for providing a substantial air volume to provide a compression area during movement of the piston toward the inner end of the cylinder.

2. The structure as set forth in claim 1, in which said air bag has a substantial portion disposed in the recess in the piston, a portion engaging the cylinder, and a portion disposed against the lower portion of said plate.

3. The structure as defined in claim 1 wherein said top plate includes a pair of depending threaded collars, said cylinders being threaded onto said collars to enable the air bag to be replaced.

4. The structure as defined in claim 1 wherein said cylinder includes an apertured cap slidably receiving said rod.

5. The structure as defined in claim 1 wherein said cap is provided an O-ring seal, and a spring interposed between the cap and piston to retain the piston against the air bag.

6. The structure as defined in claim 1 wherein said shock absorber construction is disposed in both the front and rear fork of the frame.

References Cited

UNITED STATES PATENTS

| 603,418 | 5/1898 | Adriance | 280—276 |
| 638,310 | 12/1899 | Baker | 280—276 |
| 768,066 | 8/1904 | Morrow | 280—284 |
| 2,428,148 | 9/1947 | Dawson | 280—276 |
| 2,464,326 | 3/1949 | MacGregor | 280—276 |
| 2,475,774 | 7/1949 | Benson | 280—276 |
| 3,243,006 | 3/1966 | Sparks | 280—276 X |

KENNETH H. BETTS, Primary Examiner

U.S. Cl. X.R.

267—65; 277—58, 153, 184; 280—288